United States Patent [19]

Taback

[11] Patent Number: 5,016,479

[45] Date of Patent: May 21, 1991

[54] TENSION GAUGE FOR THIN MATERIALS

[75] Inventor: Israel Taback, Newport News, Va.

[73] Assignee: The Bionetics Corporation, Hampton, Va.

[21] Appl. No.: 504,851

[22] Filed: Apr. 5, 1990

Related U.S. Application Data

[63] Continuation-in-part of Ser. No. 337,139, Apr. 12, 1989, abandoned.

[51] Int. Cl.⁵ ............................ G01L 5/04; G01L 5/10
[52] U.S. Cl. ................................ 73/862.45; 73/862.48
[58] Field of Search ................. 73/159, 802, 826, 831, 73/856, 862.45, 862.47, 862.48

[56]      References Cited
       U.S. PATENT DOCUMENTS

| | | | |
|---|---|---|---|
| 1,723,636 | 8/1929 | Tuckerman et al. | 73/802 |
| 3,296,857 | 1/1967 | Kaczeus | 73/862.47 X |
| 3,750,466 | 8/1973 | Ott et al. | 73/862.47 X |
| 4,590,808 | 5/1986 | Lightfoot et al. | 73/862.48 |

Primary Examiner—Charles A. Ruehl
Attorney, Agent, or Firm—Larson & Taylor

[57] ABSTRACT

A tension gauge for measuring the principal tensions in an elastic material and providing specific information about the magnitude and direction of the principal tension. The tension gauge employs a frame structure over which an elastic material is stretched. A depressing device depresses the center of the elastic material a known distance and the force required for this activity is measured. In the device, either the contact surface of the depressing device or the frame structure is non-symmetric about two orthogonal axes. In either case, because of the non-symmetric nature, the relative sensitivity of the tension gauge to the major axis tension and minor axis tension in the elastic material will be different and fixed by the ratio of the major and minor axis of either the frame structure or the contact surface of the depressing device, whichever is non-symmetric. The principal tensions in elastic material and information about their magnitude and direction are determined.

22 Claims, 2 Drawing Sheets

TENSION GAUGE FOR THIN MATERIALS

This is a continuation-in-part of application Ser. No. 337,139 filed Apr. 12, 1989, now abandoned.

FIELD OF THE INVENTION

The present invention relates to an apparatus and method for measuring the principal tensions in elastic material and providing specific information about the magnitude and direction of the principal tensions. More particularly, the apparatus and method of the present invention allows determination of the principal tensions, the principal stresses and the shearing stress in an elastic material such as used for a weather balloon.

BACKGROUND OF THE INVENTION

Numerous tension gauges exist in the prior art. However, the vast majority of these gauges only provide the ability to determine the average total tension in an elastic material without providing any information relating to the magnitude or direction of the principal tensions in the material. In addition, many of these tension gauges measure the elastic material distortion in order to derive tension. As a result, the tension measurements obtained from these gauges are subject to the tensile characteristics of the particular elastic material as well as expansions and contractions of the elastic material due to temperature.

Typical tension gauges are electrical or mechanical strain gauges which measure the elastic material distortion in order to derive tension. These gauge measurements generally give only sufficient information to determine tension in one direction or the total tension in an elastic material. While some embodiments of available electrical strain gauges employ multiple gauges, such as in the stress-gauge rosette, in order to obtain additional information about an elastic material, such measurements still require knowledge of specific elastic material characteristics for calculations of the desired information.

An example of a stress gauge for films is disclosed in U.S. Pat. No. 3,040,595 (Church, et al) issued on June 26, 1962. This gauge measures resonance under induced vibration to determine stresses in a film. While the patent discloses that it is sensitive to the magnitude and direction of stresses in the films, it is badly affected by bi-directional stresses and the patent gives no indication that it can be properly applied to determine a stress field. Further, this gauge is somewhat sensitive to the mass properties of the film being measured.

U.S. Pat. No. 4,590,808 (Lightfoot, et al) issued on May 27, 1986, discloses a device for measuring the average tension on tennis racket strings. In general, the device distorts the tennis racket strings out of a tension plane and measures the resulting force and/or deflection of the tennis racket strings. In this manner, the average tension of the tennis racket strings is obtained.

U.S. Pat. No. 4,103,546 also discloses a device for measuring the average tension in tennis racket strings. Again, the device distorts the tennis racket out of a tension plane and measures the resulting force and/or deflection of tennis racket strings to obtain the average tension on the strings.

U.S. Pat. No. 4,756,199 (Merritt) issued on July 12, 1988, discloses a device for measuring the tension normal to a displaced stocking held under sizing tension. The gauge deflects the stocking out of a tension plane and measures the resulting force to obtain the average tension on the stocking at a particular location.

British Pat. No. 115,338 issued on May 9, 1918, discloses an apparatus for measuring the tension of stretched fabrics. The device includes a ring over which a fabric material is retained by tension. A plunger contacts the center of the fabric material and is pushed upwardly by the tensile force exerted when stretching the fabric material over the ring frame. The movement of the plunger is measured to determine the average tension in the fabric material.

U.S. Pat. No. 4,587,855 (Yamada, et al) issued on May 13, 1986, discloses a tension meter of the type used to measure the tension of an elongated object such as string or rope. This tension gauge operates along a single axis and is only useful for rope or wire.

U.S. Pat. No. 4,048,850 (Ramberg, et al) issued on Sept. 20, 1977, discloses a mechanism for gauging the expansion of a trawl net. This device measures net tension in one direction directly by taking-up load and therefore suffers from many sources of error caused by local stress distributors.

U.S. Pat. No. 4,674,341 (Koenig) issued on June 23, 1987, discloses a web tension transducer apparatus for measuring web tension along a single axis. The device employs roller force to measure web tension, and, thus, is only capable of measuring the tension along a single axis when the material is forced against a web.

U.S. Pat. No. 4,024,755 (Queben) issued on May 24, 1977, discloses a sheet-flatness detector which employs a deflector roll for measuring and checking the flatness of sheet metal under tension. The device does not measure the tension of the sheet metal.

From the foregoing discussion, it is apparent that there is a need in the art for a tension gauge which is capable of providing specific information about the magnitude and direction of the principal tensions in an elastic material. Further, there is a need in the art for a tension gauge and method for determining the principal tensions for nets of crossed filaments wherein the direction of the tensions is desired as well as the magnitude.

SUMMARY OF THE INVENTION

The present invention relates in one aspect to a tension gauge for materials which is capable of providing information about the magnitude and direction of the principal tensions in an elastic material. The tension gauge includes a material-supporting frame structure which is non-symmetric about two orthogonal axes defining the perimeter of a predetermined test area and which is adapted to contact the material. The gauge also includes a means for moving or depressing the material a known distance at the center of the test area. Further, the device also includes a means for measuring the force applied to the center of the elastic material test area by the moving or depressing means. A means for rotating the gauge or in the use of two or more substantially identical asymmetric gauges allows for the computation at two orthogonal different axes of the tensions in the material and a determination of shear forces.

It is the primary object of the present invention to provide a tension gauge capable of measuring the principal tensions in a film or net as well as providing specific information about the magnitude and direction of the principal tensions.

It is a still further object of the present invention to provide a method of calculating the shearing stress in a film employing the tension gauge of the present invention.

It is a still further object of the present invention to provide a method of differentiating between the tensions and their direction in a net.

It is a still further object of the present invention to provide a tension gauge for measuring tensions in an elastic material which allows determination of the principal tensions, average tension and magnitude and direction of the principal tensions without knowing any specific properties of the elastic material.

These and other object of the present invention will be apparent to one of ordinary skill in the art from the detailed description which follows.

DETAILED DESCRIPTION OF THE PREFERRED EMBODIMENTS

Initially, it should be appreciated that two broad types of gauges according to the present invention are discussed herein. In the first type depicted in FIGS. 1-4, the gauge is mounted with the material between the frame structure and the means for moving the material. Unfortunately, this may require a piercing of the material. Thus, in a second, and typically more advantageous type depicted in FIGS. 5-7, both the frame structure and the moving means are located on the same side of the material. This allows for an easy mounting of the gauge to the material, without piercing of the material.

Figure 1:
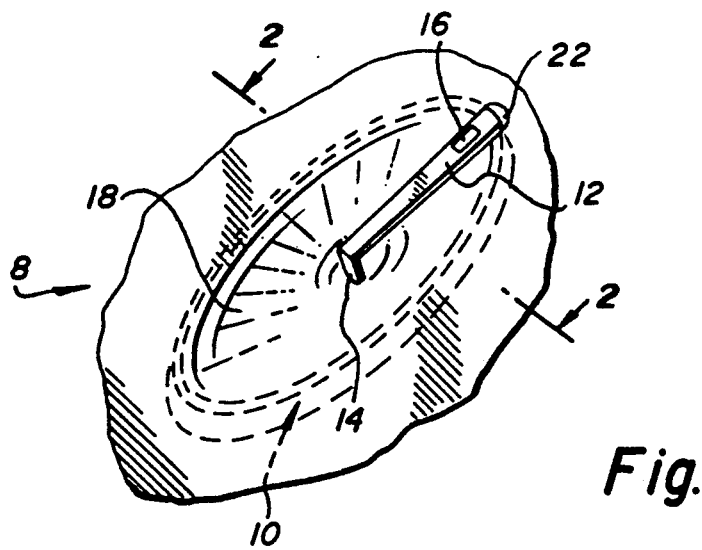
FIG. 1 is a perspective view of a first embodiment of a tension gauge in accordance with the present invention.
Figure 4:
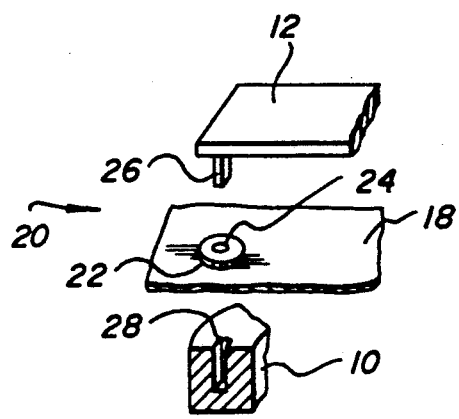
FIG. 4 is an exploded perspective view of an attachment means for a tension gauge according to the present invention.

Referring now to FIG. 1, there is shown a first embodiment of a tension gauge 8 in accordance with the present invention. Tension gauge 8 is used, for example, on a large elastic film or material 18. One proposed application for tension gauge 8 is thus for the material of high altitude weather balloons which would require a small and lightweight gauge to measure surface tensions therein. The gauge 8 includes a frame structure 10 which is asymmetric about two orthogonal axes, and in this case is elliptical in shape. Also part of the gauge 8 is an arm or beam 12 having contact surface 14 attached thereto. Beam 12 is attachable to frame 10 by any suitable means (such as shown in FIG. 4). Beam 12 also has at least one strain gauge 16 fastened to it in order to measure the deflection of the beam 12.

In the embodiment shown in FIG. 1, contact surface 14 of beam 12 holds the elastic film or material 18 in contact with frame 10 by application of tensile stress to the material 18 at a point in the center of frame structure 10. Contact surface 14 in this embodiment is axially symmetric since frame structure 10 is non-symmetric about two orthogonal axes.

Figure 2:
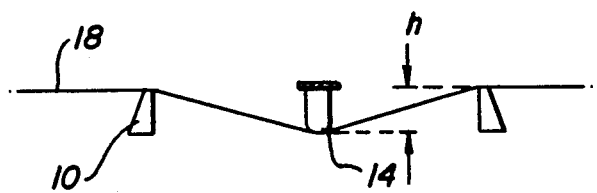
FIG. 2 is a cross-sectional view along lines 2—2 of FIG. 1.

Referring now to FIG. 2, there is shown a cross-sectional view along line 2—2 of FIG. 1. In FIG. 2, it can be seen that film 18 is depressed by contact surface 14 a distance h. Tension in the elastic material 18 is balanced by the force on beam 12 and measured by strain gauge 16 fastened to the beam 12.

In operation, beam 12 is attached at some point to frame structure 10 and a force is applied to move or depress the center of elastic material 18 a known distance h. The force on beam 12 is measured by strain gauge 16 which gives an indication of the totality of tensions in elastic material 18. Frame 10 is then rotated and a second measurement is taken. It is preferable to take the second measurement at a 90 degree angle to the first. A third measurement is made with the gauge 8 at 45 degrees to its initial location.

From two measurements lined at 90 degrees to one another, the sum of all the film tensions and the difference between orthogonal film tensions can be derived. With the third measurement made at a 45 degree angle to the first two measurements, the angle to the principal tension axes and the principal tensions and shearing force in the elastic material 18 can also be derived.

The fundamental concept of the gauge 8 of the present invention consists of using either a frame structure 10 or contact surface 14 which is non-symmetric about two orthogonal axes. For example, as shown in FIG. 1, frame structure 10 is an elliptical hoop. The elastic material 18 is stretched over frame structure 10 and the center of the stretched material 18 is depressed by contact surface 14 to determine the total force required for a known elastic material depression. This total force measurement represents the summation of all the tension forces in the elastic material 18. However, since either frame structure 10 or contact surface 14 is non-symmetric about two orthogonal axes, the relative sensitivity to the major axis tension and the minor axis tension in the elastic material 18 will be different. For example, in the device in FIG. 1, the sensitivity to the major axis tension and minor axis tension is fixed by the ratio of the major and minor axis of the elliptical frame structure 10. Subsequent to determining the tensions in three directions of the elastic material, it is a simple matter to derive the principal stresses and their angular location. Calculating the angular location has been derived as explained subsequently. These equations are similar to, but not identical to, those used with electrical strain gauges. In the latter case, material properties must be known to evaluate the tensions.

One of the important features of the present invention is that it provides a method for extracting cross-axis sensitivity from two measurements of the tension gauge of the present invention. More particularly, the force required to deflect the elastic material 18 a known distance at the center of the elliptical frame structure 10 is the sum of the $T_y$ and the $T_x$ tensions multiplied by appropriate weighing factors. Thus, it is appropriate to assume that $F = K_x T_x + K_y T_y$, where the ellipse is oriented so that $K_x$ becomes much larger than $K_y$ by definition. In other words, the minor axis of the ellipse is in the x direction. Then two measurements of F are made, one in the direction of the x axis and one in the direction of the y axis. In this manner, the following two equations are derived:

$$F_x = K_x T_x + K_y T_y \quad (1)$$

$$F_y = K_x T_y + K_y T_x \quad (2)$$

From these two equations it is simple to derive formulas for $T_x$ and $T_y$ and determine the principal tensions in the x and y directions. Further, the sum of the principal stresses is found to be the sum of the measured forces multiplied by a correction factor equal to $1/(K_x+K_y)$ This sum is the same at any orthogonal pair of measurements.

In addition to the foregoing, the direction of the principal axes $X_{PT}$ and $Y_{PT}$ an be determined from a set of three measurements taken on gauge 8 as shown in FIG. 1 at angles of 0, 45 and 90 degrees from an arbitrary axis on a uniaxially or biaxially stressed film. In particular, it was found that the angle of principal tension in the elastic material 18 can be determined from the zero angle gauge position (the initial position when taking the first gauge measurement), and can be determined from the equation:

$$(T_x + T_y)_0 / (T_x - T_y)_{0+45} = 1/\tan 2\Theta$$

No approximations are required to derive these values or the shear values accompanying them.

In operation, the gauge 8 of FIG. 1 is assembled by placing frame structure 10 on a flat surface, stretching elastic material 18 over frame structure 10 and retaining it in position by exerting tensions such as by clamping or attaching beam 12 onto frame structure 10 by any suitable means (such as discussed below). The entire gauge is rotated 90 degrees and a second measurement is taken in the same manner. From these two measurements the sum total of the tensions in elastic material 18 can be determined. If additional angle information is required, the gauge is again rotated 45 degrees to a point halfway between where the first measurement was taken and the second measurement was taken, and a third measurement is then taken. From these three measurements it is a simple matter to obtain such quantities as the direction of principal stress, the principal stresses and the shearing stress in elastic material 18.

Figure 3:
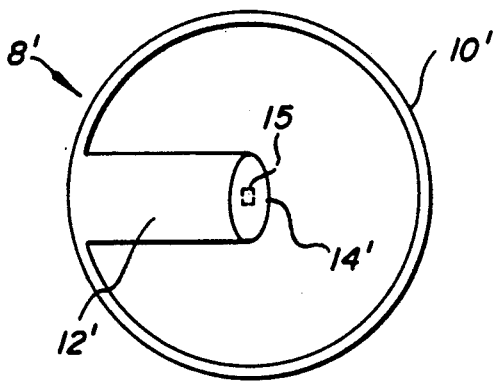
FIG. 3 is a plan view of a second embodiment of a tension gauge in accordance with the present invention.

Finally, as seen in FIG. 3, it is also possible to employ another alternative embodiment of a tension gauge 8' similar to that shown in FIG. 1, except that the frame structure 10' is symmetric about two orthogonal axes and contact surface 14' is axially non symmetric. In this embodiment, either the frame structure 10' remains in the same position whereas the contactor 14' is rotated 45 and 90 degrees respectively using a suitable connection 15 to obtain different measurements or the frame structure together with beam 12' are rotated together 45 and 90 degrees to obtain different measurements.

It is also conceivable and sometimes preferable to use three separate but identical gauges side-by-side. It is then only necessary to merely orient frame structure 10' or contact surface 14', depending upon which is non-symmetric about two orthogonal axes, differently in the three separate gauges to obtain the three measurements necessary of a particular elastic material.

As shown below, the principal stresses and their direction can be determined from a set of three measurements taken on elliptical gauges at angles of 0, 45 and 90 degrees from an arbitrary axis on a biaxially stressed film. The only assumption made in the derivation is that the gauge output is a linear function of the tensions orthogonal to the gauge axes.

In the following derivation,

O = gage output
T = film tension
x,y = subscripts re axis of gage
1,2 = subscripts re principal axes $O_x = K_x T_x + K_y T_y$ (aligned to $\theta = 0°$)

$O_x = K_x T_y + K_y T_x$ (aligned to $\theta = 90°$)

so that:

$O_x + O_y = K_x(T_x + T_y) + K_y(T_x + T_y)$ $$T_x + T_y = (O_x + O_y)/(K_x + K_y) = \Sigma O / \Sigma K_s \quad (4)$$

$$\begin{aligned} O_x - O_y &= K_x T_x + K_y T_y - K_x T_y - K_y T_x \\ &= K_x(T_x - T_y) + K_y(T_y - T_x) \end{aligned} \quad (5)$$

$$T_x - T_y = (O_x - O_y)/(K_x - K_y) = \Delta O / \Delta K$$

As shown in equations 4 and 5, the sums and differences of the tensions can be evaluated simply by using the sums and differences of the sensitivity factors.

From references that treat the Mohr diagram (i.e. *Applied Elasticity* by Chi-The Wang, 1953), it is shown that $T_x + T_y = T_1 + T_2$, and $(T_x - T_y)/2 = [(T_1 - T_2)\cos 2\theta]/2$ Using the 45° gauge:

$$\frac{(T_x - T_y)_o}{(T_x - T_y)_{(o+45)}} = \frac{T_o}{T_{(o+45)}} = \frac{\cos 2\theta}{\sin 2\theta} = \frac{1}{\tan 2\theta}$$

so that the angle of principal tension is determined as measured from the zero angle gage position.

To summarize, it is possible without iteration to: (a) Determine the sum of the orthogonal tensions without cross-axis problems; (b) Determine the difference of the orthogonal tensions without cross-axis problems; and (c) Determine the principal axis direction, and therefore the principal stresses. No approximations are required to derive these values or the shear values accompanying them.

Depicted in FIG. 4 is a suitable attaching means 20 for attaching beam 12 to frame structure 10 to allow rotation of both frame structure 10 and beam 12 to obtain tension measurements at 0, 45 and 90 degrees as desired. Attaching means 20 includes a reinforcement 22 which is suitably bonded to material 18 and in which aperture 24 is provided. A corresponding aperture is also provided in material 18, so that reinforcement 22 prevents this aperture from spreading or causing a tear in material 18. Depending from beam 12 is a rectangular or square pin 26 which passes through aperture 24. Pin 26 is frictionally received in a correspondingly shaped hole 28 provided in frame structure 10.

In order to attach tension gauge 8 to material 18, pin 26 is forced fit in hole 28 until the bottom of pin 26 engages the bottom of hole 28. When this occurs, beam 12 is securely attached to frame structure 10, and contact surface 14 depresses film 18 the desired and known distance. Gauge 8 is then simply suitably oriented at the 0, 45 and 90 degree positions as desired, using aperture 24 as a pivot point. It will be appreciated that tension gauge 8' can be similarly attached.

Figure 5:
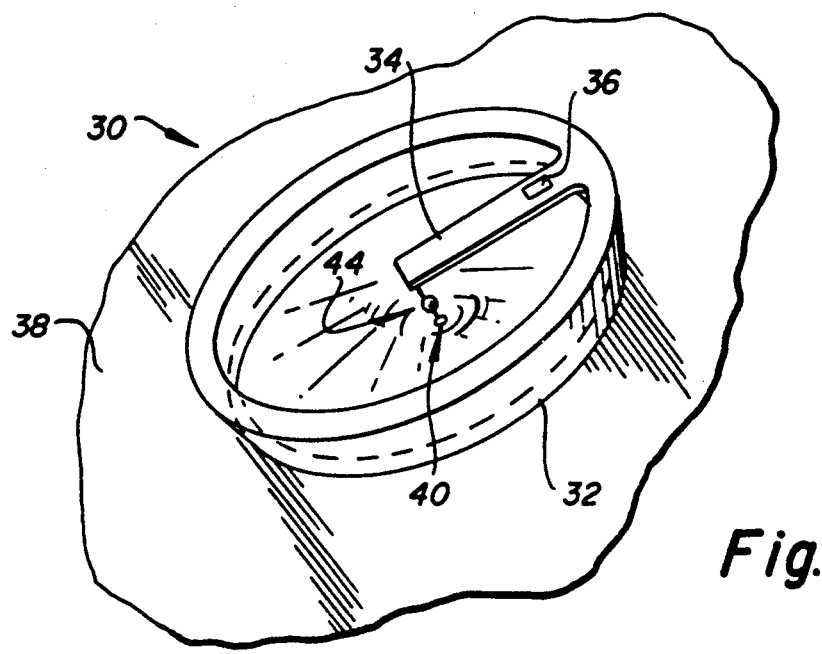
FIG. 5 is a perspective view of a third embodiment of a tension gauge in accordance with the present invention.
Figure 6:
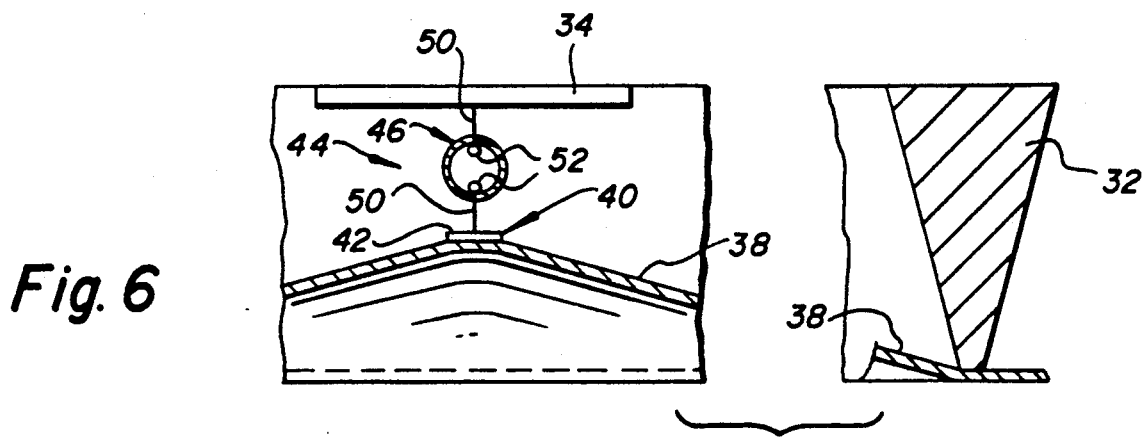
FIG. 6 is cross-sectional view of the attachment means for the tension gauge depicted in FIG. 5.

Depicted in FIG. 5 is a third alternative embodiment of a tension gauge 30 in accordance with the present invention. Tension gauge 30 is similar to tension gauge 8, in that elliptical frame structure 32 provides the part of the gauge which is non-symmetrical about two orthogonal axes. Though broadly similar, it should be appreciated that with tension gauge 30, film material 38 is drawn against the opposite side of frame structure 32 from beam 34, while in tension gauges 8 and 8', the film material is depressed against the side of the frame structure adjacent to the beam. Of course, gauge 30 could also be similar to tension gauge 8'. Tension gauge 30 also includes a beam 34 having a tension gauge 36 mounted thereon.

In this embodiment, tension gauge 30 is designed to be mounted completely on one side of material 38. In order to accomplish this, tension gauge 30 includes a contact surface 40 in the form of a small patch 42 which is adhesively or otherwise suitably bonded to material 38. Patch 42 is preferably circular or square (but in an embodiment similar to that of tension gauge 8', the patch would be elliptical). Patch 42 is connected to beam 34 by a tether means 44. Tether means 44 is included in the distance which it is desired to move or depress material 38 during a measurement. Tether means 44 preferably includes a swivel mounting 46. In this embodiment, swivel mounting 46 is simply a ball 48 having cords 50 extending from opposite sides thereof. Cords 50 are attached inside of ball 48 to anchors 52, and at their opposite ends to beam 34 or patch 42, respectively. By use of swivel mounting 46, it will be appreciated that tension gauge 30 is simply and easily rotated relative to material 38 to position tension gauge 30 at the 0, 45 and 90 degree angles desired.

It should also be appreciated that swivel mounting 46 can be omitted and a cord simply provided between beam 34 and patch 42. If the cord is sufficiently pliant and twisting of cord over 90 degrees does not result in any significant length change, the cord itself would allow the needed rotation of the gauge. Alternatively, and particularly useful for hard to reach locations, two other similar tension gauges 30 could be used adjacent thereto, and oriented at the other 0, 45 and 90 degree angles.

Figure 7:
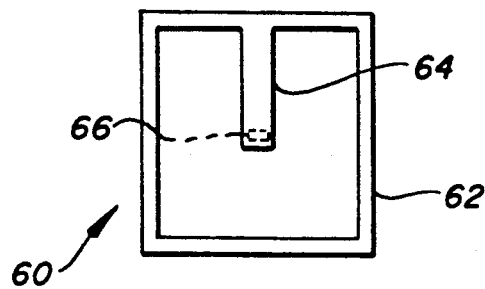
FIG. 7 is a plan view of a fourth embodiment of a tension gauge in accordance with the present invention.

Depicted in FIG. 7 is a tension gauge 60 which is similar to tension gauge 8' depicted in FIG. 3. However, in this embodiment, tension gauge 60 includes a square frame structure 62. Frame structure 62 also includes a beam 64 having a rectangular contact surface 66. It should be appreciated that other various symmetrical shapes for the frame structures and contact surfaces of the various embodiments are also possible.

In addition to the ability to secure directional information using force and deflection measuring devices according to the present invention, it is believed that the device shown in U.S. Pat. No. 3,040,595 (Church) can be improved by a similar application of the same equations. By shaping the support block of the oscillating mass so that dissimilar sensitivity is secured in two orthogonal directions, it is possible to use the same techniques and equations as herein derived to measure the direction and magnitudes of the principal stresses. The present invention is therefore an improvement of the Church patent for all applications wherein tensions exist in two directions in the material.

The foregoing embodiments of the present invention have been presented for the purposes of illustration and description only and many modifications and variations will be apparent to one of ordinary skill in the art from the above teachings. Accordingly, the scope of the invention is to be determined by the claims appended hereto.

I claim:

1. A tension gauge capable of providing information about the magnitude and direction of the principal tensions in an elastic material which comprises:

an elastic material-supporting frame structure which is non-symmetric about two orthogonal axes thereof, said frame structure defining the perimeter of a predetermined test area having a center at the intersection of the two axes and being in contact with the elastic material;

a means for moving the elastic material which is in contact with said perimeter a known distance at the center of the test area inward of said frame structure, said moving means including (a) a beam which is mounted at one end to said frame structure and which extends towards the center of said test area and (b) a contact member attached to said beam which contacts and moves the elastic material the known distance at the center of test area; and a means mounted on said beam for measuring the force applied to the elastic material at the center of the test area by said moving means.

2. A tension gauge as claimed in claim 1, wherein said contact member comprises a symmetric contact surface for moving the elastic material.

3. A tension gauge as claimed in claim 1, wherein said frame structure is symmetrically shaped about each of two orthogonal axes.

4. A tension gauge capable of providing information about the magnitude and direction of the principal tensions in an elastic material which comprises:

an axially symmetric, elastic material-supporting frame structure which is in contact with the elastic material and which defines the perimeter of a predetermined test area having a center;

a means for moving the elastic material which is in contact with said perimeter inward of said frame structure, said moving means including (a) a beam which is mounted at one end to said frame structure and which extends toward the center of said test area and (b) a contact member attached to said beam which moves the elastic material toward said frame structure, said contact member having a contact surface for contacting the elastic material which is non-symmetric about two orthogonal axes; and a means mounted on said beam for measuring the force applied to the elastic material at the center of the test area by said moving means.

5. A tension gauge as claimed in claim 4, wherein said frame structure has a shape selected from the group consisting of circular and square.

6. A tension gauge as claimed in claim 4, wherein said contact surface of said contact member has a shape selected from the group consisting of elliptical and rectangular.

7. A method for determining the sum of the tensions in an elastic sheet material comprising the steps of:

(a) holding an elastic sheet material in contact with a supporting frame structure;

(b) deflecting a side of the elastic material a known distance at the center of the supporting frame structure by an elastic material contacting surface fixed relative to the supporting frame structure, one of the frame structure or the contacting surface being non-symmetric about two orthogonal axes parallel to the elastic sheet;

(c) measuring the force required to deflect the elastic material the known distance at the center of the supporting frame structure;

(d) rotating one of the contacting surface or the supporting frame structure relative to the elastic sheet material;

(e) repeating steps (a) to (c); and (f) calculating the sum of the tensions in the elastic material from the two obtained force measurements.

8. A method for determining the sum of the tensions as claimed in claim 7 wherein the frame structure is non-symmetric and is rotated 90 degrees in the rotating step.

9. A method for determining the sum of the tensions as claimed in claim 7 wherein the contacting surface is non-symmetrical and is rotated 90 degrees in the rotating step.

10. A method for determining the sum of the tensions as claimed in claim 7 wherein the one of the contacting surface or frame structure which is non-symmetric about the two orthogonal axes is respectively symmetrical about each individual one of the orthogonal axes.

11. A method for determining the sum of the tensions as claimed in claim 7 and further including a second rotating step and a second repeating step before the calculating step.

12. A tension gauge capable of providing information about the magnitude and direction of the principal tensions in a static elastic material comprising:

an elastic material-supporting frame structure defining a perimeter of a predetermined test area having a center, said perimeter being in contact with the static elastic material;

a means for moving the elastic material, which is in contact with said perimeter, inward of aid frame structure by a known distance at the center of said test area including (a) a beam which is mounted at one end to said frame structure and which extends toward the center of said test area and (b) a contact member attached to said beam which moves the elastic material toward said frame structure, said contact member having a contact surface for contacting the elastic material;

a means mounted on said beam for measuring the force applied to the static elastic material by said moving means to move the elastic material the known distance; and wherein one of said frame structure and said contact surface is non-symmetric about two orthogonal axes.

13. A tension gauge as claimed in claim 12 wherein said frame structure is asymmetric.

14. A tension gauge as claimed in claim 13 wherein said asymmetric frame structure is elliptic.

15. A tension gauge as claimed in claim 12 wherein said contact surface is asymmetric.

16. A tension gauge as claimed in claim 15 wherein said asymmetric contact surface is elliptic.

17. A tension gauge as claimed in claim 12 and further including a rotation means for allowing rotation of said frame structure in a plane parallel to the elastic material.

18. A method for determining the sum of the tensions in an elastic sheet material comprising the steps of:

deflecting respective adjacent portions of the sheet material a known distance at a center of respective substantially identical first and second supporting frame structures by respective substantially identical material contacting surfaces fixed relative to respective said supporting frame structures, said deflecting step deflecting the respective elastic material portions in contact with a perimeter of respective said frame structures and inwardly thereof whereby the material portions are maintained in contact with the respective perimeter, one of the frame structures or the contacting surfaces being non-symmetrical about two orthogonal axes parallel to the elastic material and the two orthogonal axes of each respective one being rotated parallel to the elastic material relative to the other;

measuring the respective forces required to deflect the respective portions of the elastic material the known distance at the centers of the respective first and second support frame structures; and calculating the sum of the tensions in the elastic material from the two obtained force measurements.

19. A method for determining the sum of the tensions as claimed in claim 18 wherein the frame structures are non-symmetric and are rotated 90 degrees relative to each other.

20. A method for determining the sum of the tensions as claimed in claim 18 wherein the contacting surfaces are non-symmetric and are rotated 90 degrees relative to each other.

21. A method for determining the sum of the tensions as claimed in claim 18 wherein each one of the contacting surfaces or frame structures which is non-symmetric about the two orthogonal axes is respectively symmetrical about each individual one of the orthogonal axes thereof.

22. A method for determining the sum of the tensions as claimed in claim 18 wherein a substantially identical third frame structure and associated material contacting surface are provided; and further including the steps of deflecting and measuring with the third frame structure to provide an additional force measurement for the calculating step, and for further calculating the principal tensions.

* * * * *